United States Patent [19]
Von Seebach et al.

[11] Patent Number: 5,454,333
[45] Date of Patent: Oct. 3, 1995

[54] M/A FOR FEEDING HAZARDOUS WASTE FUELS WITH HIGH SOLIDS CONTENT INTO A CEMENT KILN

[75] Inventors: H. Michael Von Seebach, Houston; E. J. Marston, III, Dickinson, both of Tex.

[73] Assignee: Southdown, Inc., Houston, Tex.

[21] Appl. No.: 314,919

[22] Filed: Sep. 29, 1994

Related U.S. Application Data

[63] Continuation of Ser. No. 2,041, Jan. 8, 1993, abandoned.
[51] Int. Cl.$^6$ ............................................. F23K 3/00
[52] U.S. Cl. ..................... 110/101 R; 110/108; 110/109; 110/228; 110/223
[58] Field of Search ....................................... 110/108, 109, 110/101 R, 228, 223, 246

[56] References Cited

U.S. PATENT DOCUMENTS

| | | | |
|---|---|---|---|
| 3,708,078 | 1/1973 | Clements | 110/109 |
| 4,217,175 | 8/1980 | Reilly | 110/109 |
| 4,850,290 | 7/1989 | Benoit et al. | 110/246 |
| 4,951,580 | 8/1990 | Samera, Jr. et al. | 110/109 |
| 5,022,330 | 6/1991 | Burgher et al. | 110/223 |
| 5,098,285 | 3/1992 | Bauer | 110/246 |
| 5,174,750 | 12/1992 | Flading et al. | 110/246 |

*Primary Examiner*—Henry A. Bennett
*Assistant Examiner*—Siddharth Ohri
*Attorney, Agent, or Firm*—Deveau, Colton & Marquis

[57] ABSTRACT

A method and apparatus for continuously feeding hazardous waste fuels having a relatively high solids content to a rotary cement kiln by delivering the fuel to a feed hopper with screw-conveyor which transfers the fuel to a filling zone where a piston pump capable of pumping a composition having a solids content of at least 40% with particle sizes up to a maximum of 2 inches continuously charges the fuel through a conveyance tube into a feed tube which introduces the fuel into the kiln through the feed end housing.

12 Claims, 3 Drawing Sheets

M/A FOR FEEDING HAZARDOUS WASTE FUELS WITH HIGH SOLIDS CONTENT INTO A CEMENT KILN

This is a continuation of application Ser. No. 08/002,041 filed on Jan. 8, 1993, now abandoned.

BACKGROUND OF THE INVENTION

1. Field of the Invention

This invention is related generally to a method and apparatus for feeding waste fuels with a high solids content into a cement kiln, and is related specifically to a method and apparatus for continuously feeding hazardous waste fuels with high solids content into a cement kiln as a supplemental fuel source.

2. Prior Art

Cement is produced by heating raw materials, such as limestone and clay, at high temperatures of typically greater than 1400° C. to produce nodules which, when cooled, are referred to as clinker. Clinker kiln systems typically consist of a rotary kiln tilted at a slight angle and a cyclone-type suspension preheater. More modern kiln systems are also equipped with a precalciner. The finely ground and dried raw materials are fed to the preheater for preheating using the combustion gases from the kiln. From the preheater, the hot raw materials slide into the feed end of the rotary kiln, which is the highest point of the kiln, and are slowly conducted downward by the rotation of the kiln, countercurrent to the combustion gases. Combustion takes place at the lower end of the rotary kiln where the clinker material is discharged into the clinker cooler.

The raw materials first enter the preheater in which they are typically preheated to a temperature of approximately 800° C. to 850° C. From the preheater the raw materials, partially calcined, are fed to the rotary kiln in which material temperatures approach 1000° C. After calcination, the materials enter the burning or sintering zone, which is typically at a temperature of approximately 1450° C., where the chemical reaction causing the formation of clinker occurs. The clinker then exits the kiln at the lower end into a clinker cooler which serves as a preheater for the combustion air.

Heat is produced in the burning zone by the introduction of various fuels, typically pulverized coal, gas or oil. Recently, however, pumpable and solid hazardous wastes have been used a supplemental fuel to produce the heat. The pumpable hazardous wastes are fed to the burner with the sintering zone in a similar way as oil has been fed. For introducing solid hazardous waste fuels into the rotary kilns, various methods have been developed. In cement kilns with suspension preheaters burning solid hazardous waste fuel, the solid hazardous waste fuel is metered typically in batch quantities into the rotary kiln, such as in six gallon pails or in smaller pails. The prior art describes how the solid hazardous waste fuel charges are introduced directly into the combustion zone of the rotary kiln, or into the feed end housing of the rotary kiln where also the preheated raw meal is fed to the kiln. However, this type of batch or charge feed does not produce the desired constant heat source produced from a continuous feed.

In U.S. Pat. No. 3,572,524 to Muckenheim, an apparatus for charging sludges and other similar waste materials to the feed end of a rotary incinerating kiln using an endless screw-conveyor is disclosed. The Muckenheim apparatus is particularly suitable for use in conjunction with charging sludges, viscous refuse, pastey refuse, and semifluid refuse to a rotary kiln. The refuse is dumped into a stationary receiving trough having a rotatable, circular distribution plate located above the bottom of the trough. A horizontal screw-conveyor is disposed radially to the distribution plate, protruding into the receiving trough at one end and terminating at the other end in the feed housing of the rotary kiln. Refuse dumped into the receiving trough settles onto the distribution plate which, as it rotates, causes the refuse to contact the screw-conveyor, which withdraws the refuse from the trough and feeds it into the feed housing of the rotary kiln.

One disadvantage of the Muckenheim apparatus is that the screw-conveyor can only transmit the waste into the feed housing of the kiln, and cannot develop the pressure head required to pump the waste through a long pipe if it is desired to introduce the waste to a point within the rotary kiln itself. Additionally, the screw-conveyor introduces the refuse to the feed housing of the rotary kiln where the refuse first mixes with the preheated raw material prior to entering the rotary kiln. Such premature introduction of the fuel source to the preheated raw material may result in inefficient combustion and clinker product of unknown quality. Further, the use of such a rotatable distribution plate may allow the refuse to build up along the inner wall surface of the receiving trough, resulting in less efficient operation of the feed device. Furthermore, the screw conveyor would be exposed to 800° C. to 850° C. material temperatures and 900° C. to 1000° C. gas temperatures in the feed end housing of a cement kiln with suspension preheater, and no screw conveyor material is known which could withstand such temperatures.

In U.S. Pat. No. 4,850,290 to Benoit et al., a method for charging drums of solid hazardous waste directly into the central portion of a rotary kiln or into the feed end housing of a kiln with suspension preheater is disclosed. In its best mode, the Benoit apparatus comprises a feed tube located on the rotary kiln itself which, as the kiln rotates, cooperates with a second stationary feed device located beside the rotary kiln. Drums of hazardous waste are placed within the stationary feed device, and as the feed tube on the kiln itself rotates by the stationary feed device, the drums are picked up by the rotating tube. When the rotating tube reaches the eleven to one o'clock position, a slide gate opens and the drum falls into the rotary kiln. Alternately, the Benoit patent describes a chute with double air locks through which the six gallon pails can be fed into the feed end housing of a kiln system with a preheater. The primary disadvantage of the Benoit method is its batch feed operation which can cause spikes of combustibles and temperature within the rotary kiln and in the feed end housing. Another disadvantage of this method is the need to use constant size hazardous waste containing drums as the feed. This results in varying heat content of the pails as the waste composition and, consequently, the heat content of the waste changes. Consequently, the Benoit method results in uneven combustion, changing from low excess oxygen or even insufficient oxygen to too much oxygen for the combustion process.

In U.S. Pat. No. 4,984,983 to Enkegaard, a method of cofiring hazardous waste in industrial rotary kilns is disclosed. In effect, the Enkegaard method launches charges of hazardous waste directly into the burning zone of a rotary kiln using a cannon-like apparatus. The hazardous waste is placed within the cannon-like apparatus which, using a charge such as compressed air, ejects the hazardous waste pails directly into the burning zone of the kiln. Similar to the Benoit apparatus, the Enkegaard apparatus suffers the disadvantage of batch-like feeding resulting in uneven combustion conditions.

Current cement kiln feeding technology of hazardous wastes as fuel can be categorized as follows: (1) continuous feed of liquid, pumpable wastes with up to 40% suspended solids to the hot or discharge end; or (2) batch feed of high solids content wastes to the feed end housing or mid-kiln. Although the batch feed technology is applicable to both high liquids content and high solids content wastes, current continuous feed technology cannot be applied to high solids content wastes. Therefore, it can be seen that there is a need for a technology for the continuous feed of high solids content hazardous waste fuels to rotary cement kilns. It is to this end that the present invention is directed.

BRIEF SUMMARY OF THE INVENTION

The purpose of this invention is to allow the continuous feed as fuel of hazardous wastes comprising a relatively high solids content directly into a rotary cement kiln. Contrary to present teaching, this invention does not introduce the high solids content hazardous waste fuels in a batch manner, such as the generally accepted six-gallon drum method, which creates often significant heat and combustible spikes within the kiln, but allows a continuous feed of the hazardous waste fuel to the kiln, which gives a ready flow of fuel and allows more even combustion without the heat, carbon monoxide or hydrocarbon spikes typically produced by the prior art batch feeding methods, especially when the hazardous waste contains portions that are highly volatile and combust very rapidly when exposed to temperatures above 900° C.

The feed end of a rotary kiln is the transition between the preheater, or the preheater with precalciner, and the rotary kiln, through which fuel typically is fed to the kiln. The raw materials used to make cement are fed from the preheater to the feed end housing attached to and communicating with the upper end of the kiln. Sloped sides on the feed end housing facilitate the introduction of the raw materials to the kiln. Various fuels to enhance decarbonization or calcination of the feed material also have been fed into the kiln through the feed end housing. These fuels include whole tires, chipped tires or six-gallon drums of hazardous wastes. Alternatively, these fuels can be introduced mid-kiln into the same temperature zone of a long dry or wet kiln. In cement kilns with preheaters or with preheaters and calciners burning solid hazardous waste fuels, the solid fuel typically had been metered in batch charges, such as the aforementioned six gallon drums, into the feed end housing of the rotary kiln, to be introduced to the kiln along with the raw materials.

The present invention is a system comprising known components configured in a novel manner to accomplish a more desirable continuous novel feed method. The apparatus of the present invention comprises a feed hopper into which the hazardous waste, typically delivered in 55-gallon drums, is emptied. The hazardous waste is discharged through the bottom of the feed hopper into a screw-conveyor, preferably a double screw-conveyor, which transfers the hazardous waste in a continuous manner to a piston pump, typically a double piston pump, as used for concrete or sludge conveying. The piston pump moves the hazardous waste fuel into a waste feed pipe which extends through the feed end housing of the rotary cement kiln directly into the feed end of the kiln.

The combination of these pieces of equipment allows hazardous waste to be emptied continuously in the feed hopper, as the feed hopper also can function as a fuel storage reservoir, thus allowing the screw-conveyor to have a continuous supply of hazardous waste fuel from the feed hopper to transfer to the piston pump. In this manner, the piston pump always has a continuous supply of hazardous waste fuel to move into the conveying pipe which leads to the waste feed pipe. The preferred piston pump has the ability to move hazardous waste fuel having a solids content of greater than 40% with a particle size of up to approximately 1–2 inches. The portion of the waste pipe which extends through the feed end housing into the rotary kiln is air or water cooled and can function as a burner. The cooling of the waste feed pipe prevents the hazardous waste fuel from being preheated, and possibly ignited, prior to entering the kiln. An air jacket or sleeve around the waste feed pipe may also be used to force combustion air into the kiln along with the hazardous waste fuel.

Accordingly, it is an object of the present invention to provide a method and apparatus for the continuous feeding of hazardous waste fuels having a relatively high solids content to a rotary cement kiln with a preheater or preheater and precalciner.

It is another object of the present invention to provide a method and apparatus for the continuous feeding of hazardous waste fuels directly into the feed end of a rotary cement kiln with preheater or with preheater and precalciner.

Yet another object of the present invention is to provide a method and apparatus for the continuous feeding of hazardous waste fuels to a feed pipe in which the fuels are prevented from prematurely igniting prior to their introduction into a rotary cement kiln.

Still another object of the present invention is to provide a method and apparatus for the continuous feeding to a rotary cement kiln of hazardous waste fuels which cannot be handled by conventional fuel feeding devices.

Another object of the present invention is to provide a method and apparatus for the continuous feeding of hazardous waste fuels to a rotary cement kiln which is simple, safe and economical in operation and durable in construction.

These objects, and other objects, features and advantages, of the present invention will become apparent to one skilled in the art when the following detailed description of the preferred embodiments is read in conjunction with the appended figures, in which like references denote like parts throughout the several views.

DETAILED DESCRIPTION OF THE PREFERRED EMBODIMENTS

Cement is produced by preparing the necessary raw materials in the necessary proportions and in the proper physical state of fineness and intimate contact so that chemical reactions can take place at the calcining and sintering temperatures in the kiln to form the end product, typically referred to as clinker. In general, the raw materials are crushed, passed through grinding, separation and mixing apparatuses and then introduced to a kiln. The preferred method for cement production is to introduce a dry, powdered raw material directly to a preheater or preheater with precalciner prior to feeding the preheated and partially calcined raw material into the rotary kiln, which is heated by burning oil, gas, pulverized coal, or other fuel, typically by using the preheated air from the clinker cooler.

Combustible waste and combustible hazardous waste products have been used as a supplemental energy source in the cement manufacturing process. The temperatures at which cement clinker is formed are high enough to completely combust the hazardous wastes, resulting in the thermal destruction of an unwanted product and conserving fossil fuels, while at the same time producing a necessary construction product. Liquid hazardous wastes are fairly simple to feed into a combustion apparatus. Granulated and powdery waste products typically can be handled in a similar fashion to pulverized coal. However, as discussed above, the methods for charging solid hazardous waste, or hazardous waste with a high solids content, into a rotary kiln have been limited to batch or charge feeding through the kiln shell or introduction to the feed end housing of the rotary kiln. Many solid hazardous wastes cannot be transformed into a pumpable or powdery substance for many reasons, including safety, physical limitations or economy. The present invention allows such solid hazardous wastes and hazardous wastes having high solids content to be used efficiently in a cement rotary kiln with preheater or preheater and precalciner.

Figure 1:
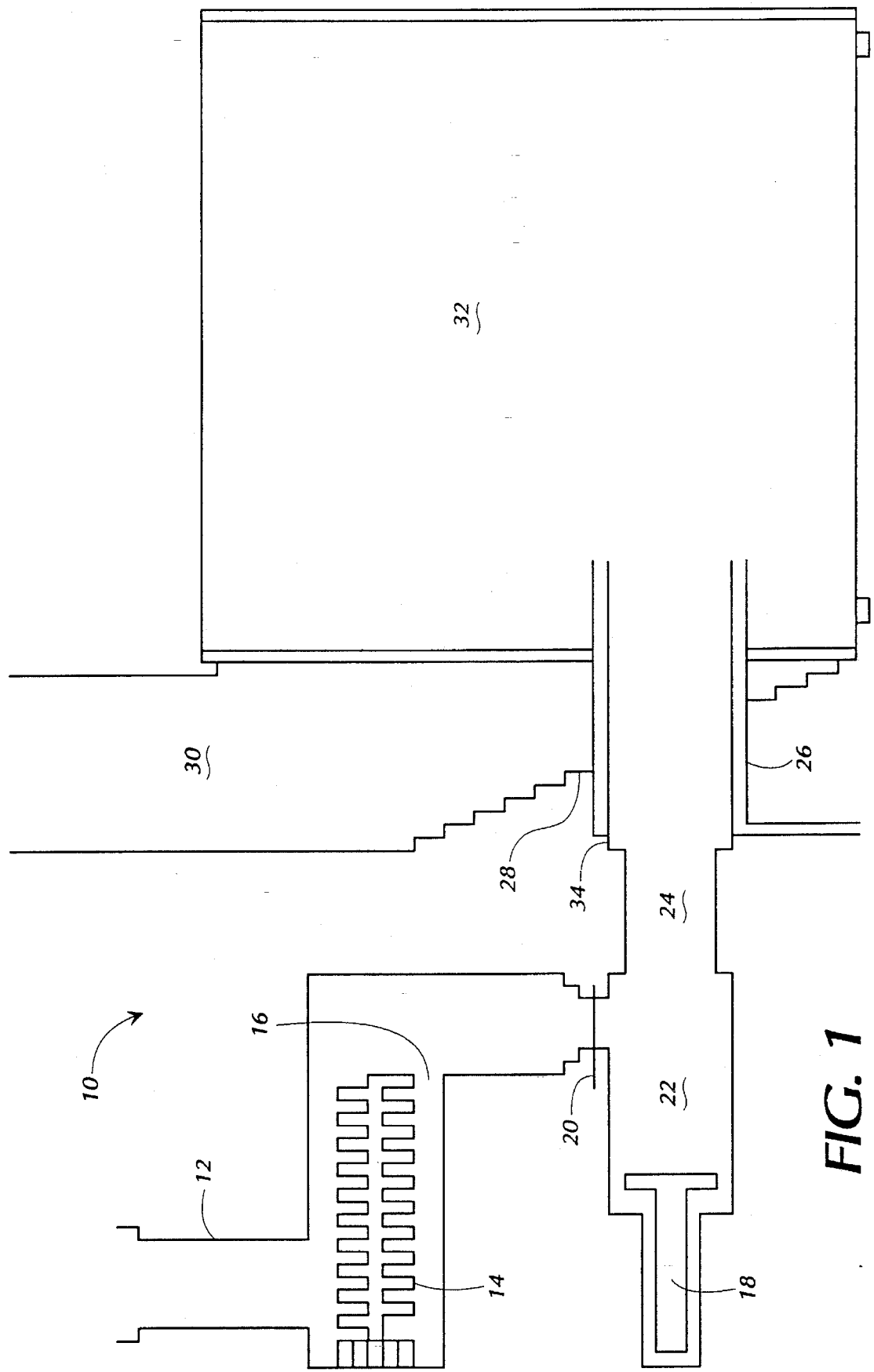
FIG. 1 is a schematic side view of a preferred embodiment of the present invention.
Figure 2:
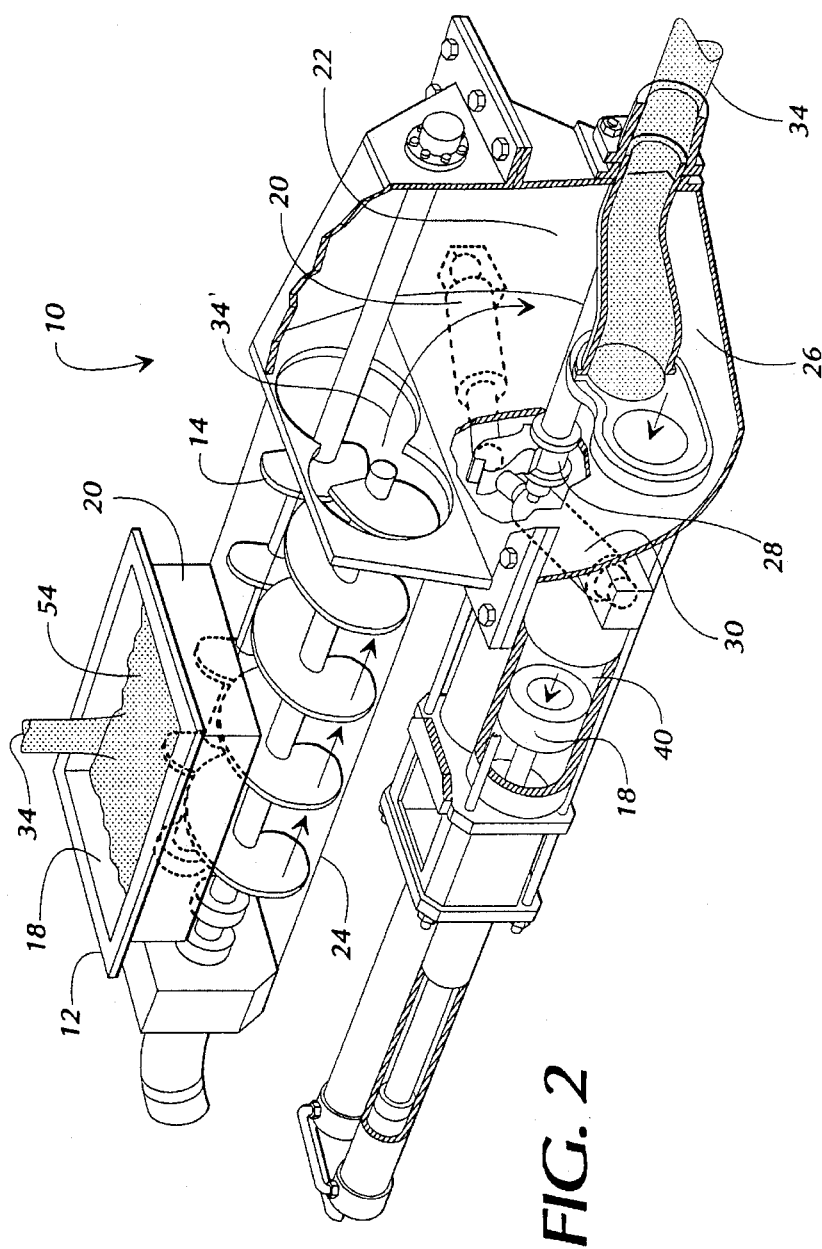
FIG. 2 is a perspective view of a portion of the preferred embodiment of the present invention showing the feed hopper with double-screw conveyor and double-piston pump.
Figure 4:
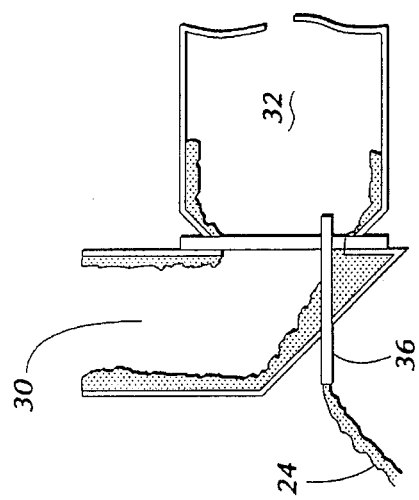
FIG. 4 is a side view in section of the feed end housing showing the feed location relative to the raw meal feed.
Figure 3:
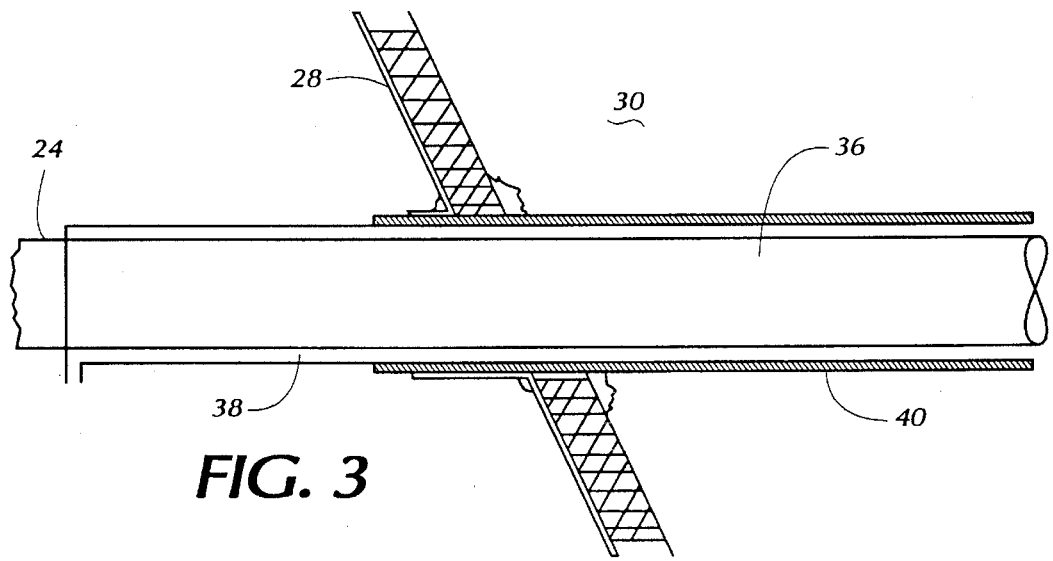
FIG. 3 is a schematic side view in section of a portion of the preferred embodiment of the present invention showing the position of the hazardous waste fuel feed pipe connected through the feed end housing of a typical rotary cement kiln with preheater.
Figure 5:
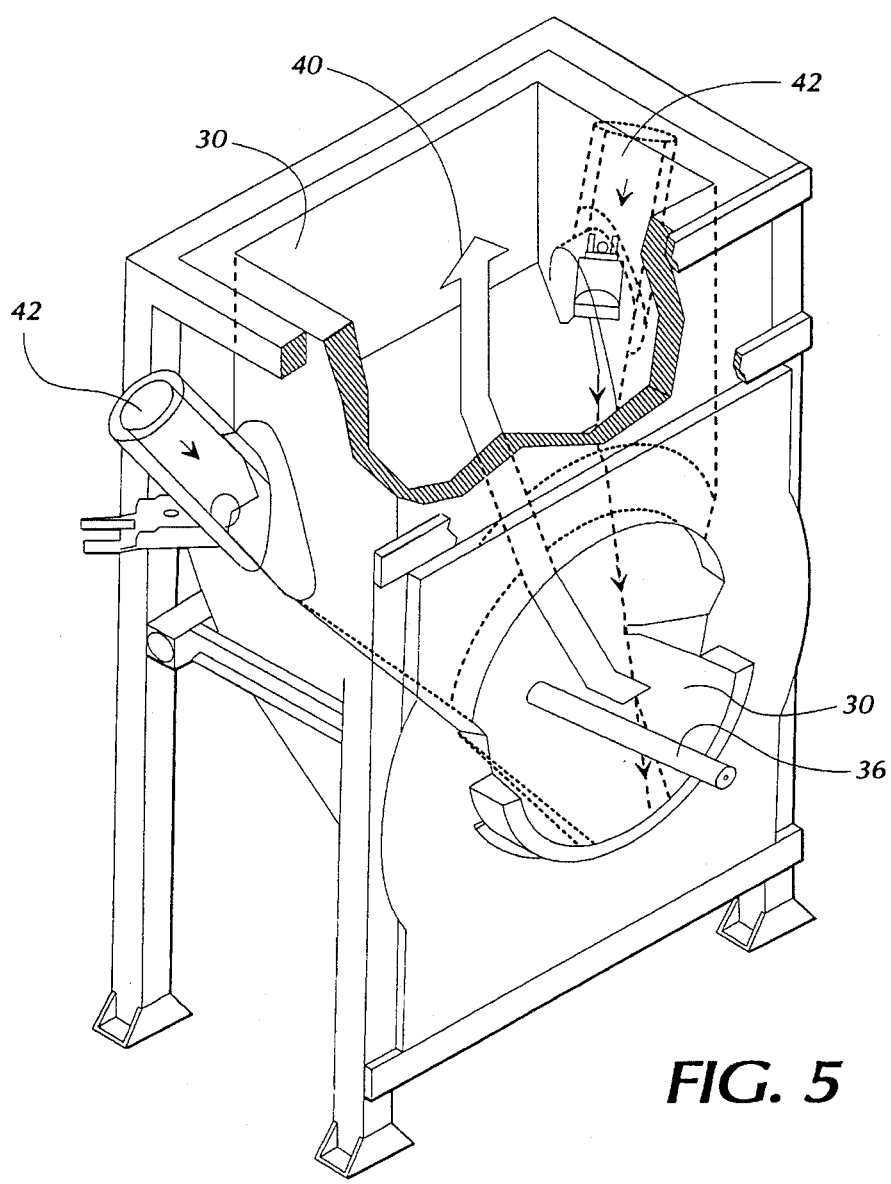
FIG. 5 is a perspective view partly in section of the feed end housing showing the feed location.

Referring now to the figures, FIG. 1 shows schematically the embodiment of the apparatus of the present invention. FIGS. 2 and 3 show the essential components of the apparatus of the present invention, the pump and the waste feed pipe, respectively. FIGS. 4 and 5 provide the location of the feed pipe relative to the kiln feed end housing and to the rotary kiln.

FIG. 1 gives a schematic overall diagram of the apparatus of the present invention. The hazardous waste with high solids content is discharged into the feed hopper 12 of the feed apparatus 10. Typically, the hazardous wastes are supplied to the system in 55-gallon drums. The drums may contain liquids, pastes, sludges and mixtures thereof with solids contents of up to 70–80%, giving the waste the consistency of a heavy sludge or a heavy slurry, or a concrete with extremely low water content. The solids in the hazardous wastes may consist of shredded filters or other shredded personal protection devices, shredded rags and absorbents from cleanup operations as well as metal parts, which may have passed a waste shredder in particle sizes up to 1–2 inches.

The feed hopper 12, of which only the lower flange is shown, may be different in size but is characterized by sloped walls which allow the waste to discharge by gravity into the screw conveyor 14. The screw conveyor 14 provides a "life bottom" to the feed hopper 12, thus allowing the discharge of materials that do not flow easily. The screw conveyor 14 fits tightly in the screw conveyor trough 16 as to form a conveyor that develops pressure in the material to be conveyed. Thus, the screw conveyor builds sufficient pressure to press the hazardous waste into the piston pump 18. Since in the preferred embodiment the piston pump is a dual piston pump, a valve 20 opens after one piston has pulled back. In the meantime, the other piston moves forward moving the hazardous waste from the filling zone 22 into the conveying pipe 24. The conveying pipe is a pressure resistant pipe with bends and curves, and pressure resistant bolted or clamped connections which connect the feed apparatus 10 with the waste feed pipe 26. The waste feed pipe 26 penetrates through the refractory lined back wall 28 of the kiln feed end housing 30 cantilevering into the rotary kiln 32.

Some of the essential components and the locations thereof, which are part of this invention, are shown in FIGS. 2 through 5. FIG. 2 shows a perspective view of the feed apparatus 10. Only the lower flange of the feed hopper 12 with its life bottom formed by the double screw conveyor 14 is shown. The perspective view also shows systematically the forced flow of the hazardous waste 34 from the bottom of the feed hopper through the screw conveyor 14 to the filling zone 22 of the double piston pump 18. A valve 20, pneumatically operated, in the filling zone 22 allows the filling of the piston pump 18 as the pistons move back and forth in an alternating manner. In the forward stroke, the pistons 18 move the hazardous waste past the valve 20, which has now closed the pan to the filling zone 22, into the conveying pipe 24. The alternating movement of the pistons results in a quasi-continuous flow of the hazardous waste into the conveying pipe.

Typically the feed apparatus 10 will be located on grade level. This allows the 55-gallon drums to be emptied by means of a crane or hydraulic mechanism into the feed hopper 12. From the feed apparatus 10, the conveying pipe 24 is routed to the feed end housing 30 of the rotary kiln 32. The elevation of the feed end housing is typically 25 to 100 feet above grade level, depending on the size of the rotary kiln system and on other design parameters of the preheater or preheater/precalciner kiln system.

FIG. 3 is a sectional view of the transition of the conveying pipe 24 to the hazardous waste feed pipe 36 as the feed pipe penetrates the refractory lines back wall of the kiln feed end housing 30. The figure shows that the waste feed pipe 36 is sleeved with a mantle for cooling air 38. The cooling air does not only ensure the structural integrity of the feed pipe under the severe thermal conditions of up to 1200° C., typically 900° C.–1000° C., but it also provides some combustion air for the hazardous waste used to fuel the rotary kiln. For additional protection, the hazardous waste feed pipe 36 is protected with refractory lining 40 on the outside of the air cooling mantle 38. The double protection with air cooking and refractory lining is required since the feed pipe 36 typically cantilevers 3 to 20 feet into the rotary kiln 32.

A sectional view of the feed pipe 36 entrance to the kiln 32 arrangement is shown in FIG. 4. The conveying pipe 24 is connected to the hazardous waste feed pipe 36 which penetrates through the feed end housing 30 into the rotary kiln 32. A perspective view of this arrangement is given in FIG. 5, looking at the feed end housing 30 from the rotary kiln side. The figure shows the feed pipe 36 penetrating through the back end of the feed end housing 30 cantilevering into the rotary kiln (not shown). FIG. 5 further illustrates how the rotary kiln off-gases 40 leave the rotary kiln and rise in the feed end housing 30 countercurrent to the preheated and partially precalcined raw meal. 42, which enters the feed end housing through two meal chutes, or, in other designs, through one centrally located meal chute.

The hazardous waste feed apparatus with conveying pipe and with hazardous waste feed pipe can be retrofitted to existing rotary kiln systems with preheater or with preheater and precalciner to allow a continuous feed of hazardous wastes with high solids contents to supplement conventional fuels. The system can, of course, also be installed as part of a new kiln system. For proper fire protection and protection against explosion of the volatile compounds of the hazardous waste, it is also advantageous to provide inertization to the system in case of power outages. It is furthermore advantageous that in case of power outages, the feed pipe can be removed from the feed end housing by pulling it out. Typically, this is accomplished by pneumatically operated pistons which are automatically activated in case of power failure.

In this manner, a method and apparatus for feeding hazardous waste fuels with high solids contents as supplemental fuels into a cement kiln in a continuous manner is provided. The above-detailed description of the preferred embodiments is for illustrative purposes only and is not meant to limit the spirit and scope of the invention and its equivalents as defined in the appended claims.

What is claimed is:

1. An apparatus for the essentially continuous feeding of hazardous waste fuel having a solids content into a cement kiln, comprising:
    a storage means;
    a conveyance means;
    a pumping means; and
    a feed means,
   wherein:
    said storage means, positioned above said conveyance means comprises a hopper having at least one upwardly extending containing wall, having a top and a bottom, for receiving and temporarily storing the waste fuel, and a discharge opening adjacent to the bottom of said at least one containing wall, wherein gravity causes the waste fuel to be discharged through said discharge opening into said conveyance means;
    said conveyance means, positioned below said storage means, comprises a waste fuel inlet at one end thereof connected to said discharge opening of said hopper, at least one material conveying screw within a casing which forms a live bottom under said storage means, said material conveying screw terminating at a waste fuel outlet proximally located to said pumping means, whereby a continuous supply of waste fuel is charged into said pumping means at a sufficient pressure to force the waste fuel into the pumping means;
    said pumping means, located at said waste fuel outlet of said conveying means, comprises a filling zone for receiving the waste fuel from said conveying means, a plurality of piston-type pumps for driving the waste fuel into said feed means, and a plurality of valves corresponding to the number of said piston-type pumps for preventing backflow of the waste fuel within said filling zone during the forward motion of said piston-type pumps, whereby the waste fuel delivered to said filling zone by said conveyance means is pumped in an essentially continuous manner into said feed means under sufficient pressure such that the waste fuel traverses the entire length of said feed means; and said feed means, in contact with said pumping means for receiving the waste fuel from said pumping means and feeding the waste fuel into the feed end of the cement kiln and originating at the termination of said pumping means, comprises a pressure resistant pipe with associated connections serving as an interface between said pumping means and a feed pipe, said feed pipe terminating within the feed end of the cement kiln, whereby waste fuel is transported from said pumping means and discharged into the feed end of the cement kiln.

2. The apparatus as claimed in claim 1, wherein said feed pipe is cooled and insulated.

3. The apparatus as claimed in claim 1, wherein said feed means further comprises an air jacket surrounding said feed pipe for at least a portion of its length and said feed pipe is cantilevered into the kiln.

4. The apparatus as claimed in claim 1, wherein said pumping means comprises two piston-type pumps acting in alternating, reciprocal fashion.

5. The apparatus as claimed in claim 1, wherein the hazardous waste fuel comprises at least 40% solids.

6. The apparatus as claimed in claim 1, wherein the hazardous waste fuel comprises between 60% and 75% solids.

7. The apparatus as claimed in claim 1, wherein the solids have a maximum particle size of 2 inches.

8. The apparatus as claimed in claim 1, wherein the solids have a maximum particle size of between 1 inch and 2 inches.

9. A method for essentially continuous feeding of hazardous waste fuels having a solids content into a cement kiln comprising the steps of:
    (a) introducing the hazardous waste fuels into a hopper through which the fuel is permitted to flow by gravity out of a discharge end of said hopper and into a material conveyance screw means;
    (b) conveying the fuels discharged from said hopper in a continuous manner using said screw conveyance means from said discharge end of said hopper, through the screw conveyance means, and into a filling zone of a pumping means, whereby the continuous introduction of fuels into said filling zone causes the fuel to be under pressure; and then
    (c) pumping the fuels introduced into said filling zone by said conveyance means in a continuous manner using a multi-piston-type pumping means, the fuels flowing into the pumping means due to a positive pressure created by said conveying means, pumping the fuels through a thermally insulated feed means, and into the feed end of a cement kiln.

10. The method as claimed in claim 9, wherein the fuels have a solids content of at least 40%.

11. The method as claimed in claim 9, wherein the solids content of the fuels have a maximum particle size of 2 inches.

12. The method as claimed in claim 9, wherein the fuels have a solids content between 40% and 75%.

* * * * *